Dec. 16, 1924.
O. E. BARTHEL
GUIDING MEANS FOR CAR BODIES
Filed Jan. 20, 1921
1,519,349
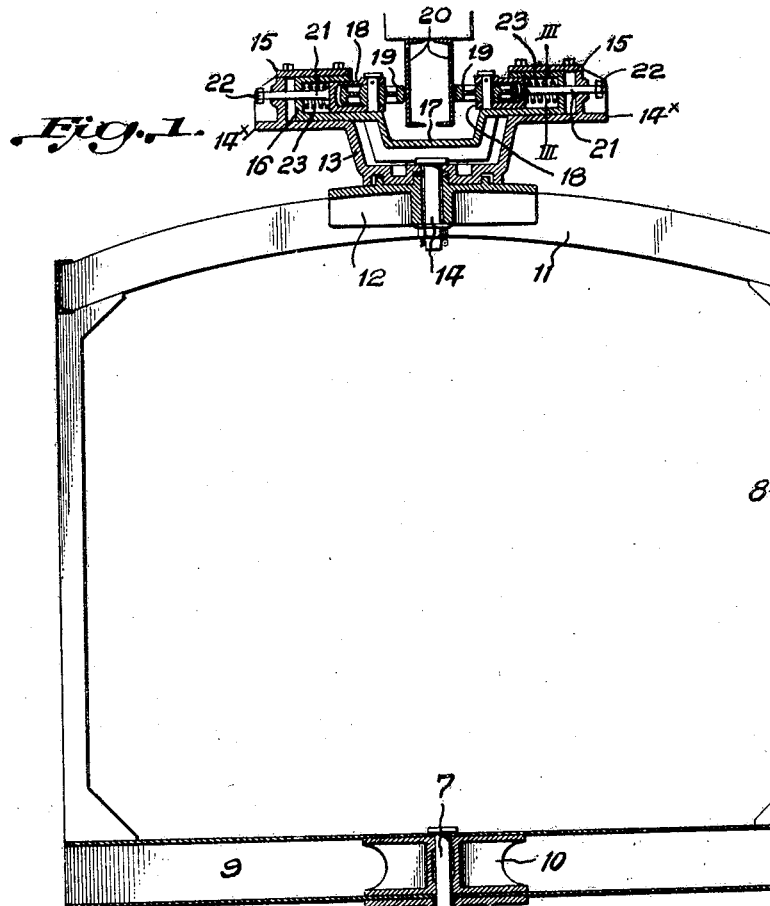
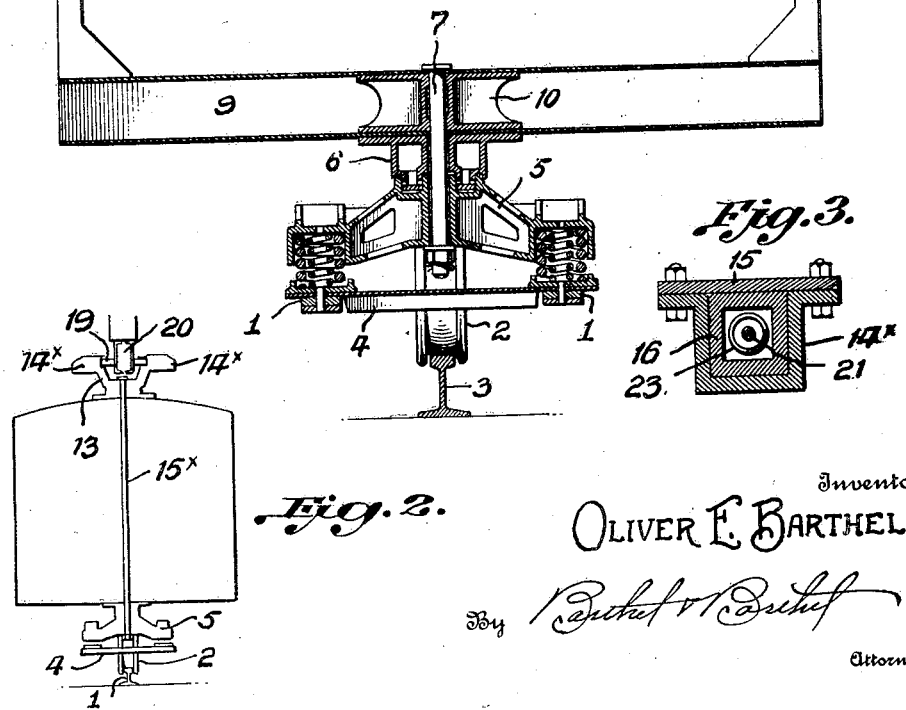
Inventor
OLIVER E. BARTHEL
By Barthel & Barthel
Attorneys Patented Dec. 16, 1924.

1,519,349

UNITED STATES PATENT OFFICE.

OLIVER E. BARTHEL, OF DETROIT, MICHIGAN.

GUIDING MEANS FOR CAR BODIES.

Application filed January 20, 1921. Serial No. 438,613.

*To all whom it may concern:*

Be it known that I, OLIVER E. BARTHEL, a citizen of the United States of America, residing at Detroit, in the county of Wayne and State of Michigan, have invented certain new and useful Improvements in Guiding Means for Car Bodies, of which the following is a specification, reference being had therein to the accompanying drawings.

This invention relates to guiding means for car bodies, and has special reference to a monorail system of traction, wherein a car body or train travels between top and bottom rails, or similar guide means, in contradistinction to a single overhead rail or a pair of bottom rails.

The primary object of my invention is to provide a top and bottom of a car body or car body frame with novel trucks for supporting the car body between the top and bottom rails so that the car body may be safely used and conform to all operative requirements of a monorail system of traction.

Another object of this invention is to furnish the car body with top and bottom trucks and vertically alining king bolts by which the car body may be swiveled or trunnioned between the trucks, the arrangement of the king bolts being such as to provide an uninterrupted or clear passage in the car body.

Another object of this invention is to furnish the car body with trucks having a single king bolt articulating the trucks so that the car body will be swiveled or trunnioned relative to the truck.

A further object of this invention is to provide a car body with an overhead trolley including a novel equalizing member by which opposed trolley wheels are yieldably held relative to a guide rail.

A still further object of this invention is to provide a trolley embodying a swiveled base, horizontally disposed trolley wheels adapted to yieldably engage a rail, and equalizing means articulating the wheels to constantly maintain the wheels in engagement with the rail.

The above and other objects are attained by a construction that will be hereinafter described and then claimed, and reference will now be had to the drawing, wherein—

Figure 1 is a vertical cross sectional view of a car body, showing a car frame provided with top and bottom trucks in accordance with my invention;

Fig. 2 is a diagrammatic view illustrating a single king bolt, and

Fig. 3 is an enlarged cross sectional view taken on the line III—III of Fig. 1.

In my pending application filed Dec. 4, 1920, Ser. No. 428,216, there is disclosed a truck for a monorail system of traction, and in order that this invention may be understood, I have shown a portion of a truck as including, among other things, side frames 1, a wheel 2 on a rail 3, a spring plank 4, a bolster 5 suitably supported by the frame 1, swiveled center plates 6, and a king bolt 7. The above recited elements constitute a bottom truck and one or more of these trucks support a car body.

Instead of showing a complete car body, there is illustrated a car body frame 8 having a floor sill or beam 9 provided with a center bearing 10 to which the center plate 6 of the truck is suitably connected, with the king bolt 7 extending through the center bearing 10, so that the car frame and the center plate 6 will be swiveled on the truck. The car frame 8 includes a roof beam 11 provided with a center plate 12, and swiveled on said center plate is a trolley base 13 retained thereon by a king bolt 14, said king bolt vertically alining with the king bolt 7. As shown in Fig. 1 the separate and independent king bolts 7 and 14 do not interfere with the passage in the car body frame 8, and said car body frame constitutes a connection between the center plates 6 and 12 so that the car body frame may turn, in a lateral plane, between the truck and the trolley base 13. In some instances a single king bolt 15$^x$, as shown in Fig. 2, may connect the trolley base 13 and the truck and when a single king bolt is used, the car body may be built around the king bolt.

The trolley base 13 is somewhat Y shaped in end elevation with its arms provided with opposed housings 14$^x$ having detachable top plates 15, and slidable in said housing are the guide ends 16 of a yoke shaped equalizing member 17, the central portion of said equalizing member being depressed and suitably reinforced.

Slidable in the guide ends 16 of the equalizing member 17 are trolley harps 18 provided with opposed horizontally disposed trolley wheels 19 adapted to travel against a top rail or guide 20, which has been shown in the form of two confronting channel bars.

The trolley harps 18 have guide rods 21 extending through the guide ends 16 of the equalizing member 17 and the outer ends of the housings 14ˣ, said rods having the outer ends thereof provided with nuts or abutments 22. Encircling the guide rods 21 within the end guides 16 of the equalizing member 17, are coiled expansion springs 23, and the expansive force of these springs is adapted to constantly maintain the trolley wheels 19 of the harps 18 in engagement with the top rail 20.

The equalizing member 17 is slidably supported by the housings 14ˣ of the trolley base 13, and it is possible for the expansive force of one of the springs 23 to shift the equalizing member 17 and thus properly position the guide ends 16 relative to the top rail 20 with the depressing portion of the equalizing member providing clearance for the top rail. In operation, tilting or lateral swaying of the car body frame 8 may cause the trolley base 13 to contact with one side or the other of the equalizing member 17 and when this occurs the guides 16 of the equalizing member 17 will cause one of the springs 23 to be placed under additional tension and the tension of the other spring reduced, but in no instance does the tension of the springs permit the wheels 19 to move out of contact with the top rail 20. There is always a positive contact so that should the car body be electrically driven there is no danger of an electrical disconnection between the top rail and the trolley construction.

The swiveled trolley base 13 and its yieldable horizontally disposed trolley harps 18 constitutes a top truck for the top of the car body frame and it is these superposed trucks that permit of the car body frame 8 laterally swinging when the top and bottom truck encounter curved rails.

What I claim is:—

1. The combination of a car body, a rail above said body, and swiveled yieldable means engaging opposite sides of said rail to prevent excessive tilting of said body, said means being laterally yieldable relative to said rail.

2. Over head guiding means for a car body comprising a truck, an equalizing member in said truck, and opposed rail end engaging means in said equalizing member.

3. Guiding means as in claim 2 characterized by said truck being swiveled and said equalizing member sliding in said truck.

4. Guiding means as in claim 2, characterized by said rail engaging means being in the form of wheel harps yieldable in said equalizing member.

5. Overhead guiding means for a car body relative to a rail, comprising a truck, opposed rail engaging wheels, means supporting said rail engaging wheels relative to said truck maintaining said wheels constantly in engagement with the rail irrespective of the position of the truck relative to the rail, and springs associated with said wheels with the wheel supporting means disposed to vary the tension of said springs during lateral movement of the truck relative to the rail.

6. A trolley for a car, comprising opposed horizontally disposed rail engaging wheels, harps for the wheels, a shiftable equalizing member supporting said harps, and means interposed between said harps and said member permitting movement of said harps during shifting of said equalizing member.

7. The combination of a car, a rail, and a rail engaging trolley for the car, comprising a truck between the rail and car, a shiftable equalizing member between the rail and said truck and supported by said truck, and opposed horizontally disposed wheels supported from said equalizing member and constantly engaging the rail.

8. The combination set forth in claim 7, wherein said wheels are carried by spring pressed harps slidable in said equalizing member.

9. A trolley comprising horizontally disposed wheels, harps therefor, springs pressing said harps, a member adapted to simultaneously increase the tension of one spring and decrease the tension of the other spring, and means slidably supporting said member.

In testimony whereof I affix my signature in presence of two witnesses.

OLIVER E. BARTHEL.

Witnesses:
ANNA M. DORR,
ANNA C. RAVILER.